United States Patent [19]

Artim et al.

[11] 4,402,544
[45] Sep. 6, 1983

[54] FOLDING CANOPY FOR TRUCK AND TRAILER LOADS

[76] Inventors: Rufus R. Artim, 8400 Westlake Dr., Merrillville, Ind. 46410; James A. Mills, 1632 Virginia St., Gary, Ind. 46407

[21] Appl. No.: 337,531

[22] Filed: Jan. 7, 1982

[51] Int. Cl.³ .............................................. B60J 7/00
[52] U.S. Cl. .................................. 296/110; 135/102; 135/88
[58] Field of Search ............... 135/5 A, 5 R, 7, 7.1 A, 135/7.1 R, 88, 102, 103, 117; 296/100, 107, 109, 110, 111; 160/134

[56] References Cited

U.S. PATENT DOCUMENTS

| | | | |
|---|---|---|---|
| 2,142,851 | 1/1939 | Jolly | 135/7.1 R |
| 2,877,722 | 3/1959 | Peat | 135/5 A |
| 3,161,231 | 12/1964 | Dawson et al. | 135/7.1 R |
| 3,419,025 | 12/1968 | Kearns | 135/5 R |
| 3,773,379 | 11/1973 | Loiseau | 296/100 |

*Primary Examiner*—Richard C. Pinkham
*Assistant Examiner*—Stephen Crow
*Attorney, Agent, or Firm*—Marmaduke A. Hobbs

[57] ABSTRACT

A canopy for truck and trailer loads in which a cover of a sheet of flexible water resistant material is supported by a plurality of inverted U-shaped members pivoted on opposite sides of the load by support members attached to the bed of the truck, trailer or pallet. The U-shaped members and the flexible sheet fold downwardly at one end of the load, thus fully exposing the load, and unfold over the load with the two end U-shaped members in substantially horizontal position extending oppositely from one another and the other U-shaped members being spaced from the end members and from each other throughout the distance between the two end members. A flexible strap interconnects most of the U-shaped members to assist in obtaining the desired spacing of the members in the unfolded position. The lower edges of the cover are secured to the bed or pallet when the canopy is in its unfolded position to hold the cover firmly over the load while it is being hauled by the truck or trailer. The cover is secured only to that U-shaped member which is uppermost when the cover is folded.

14 Claims, 6 Drawing Figures

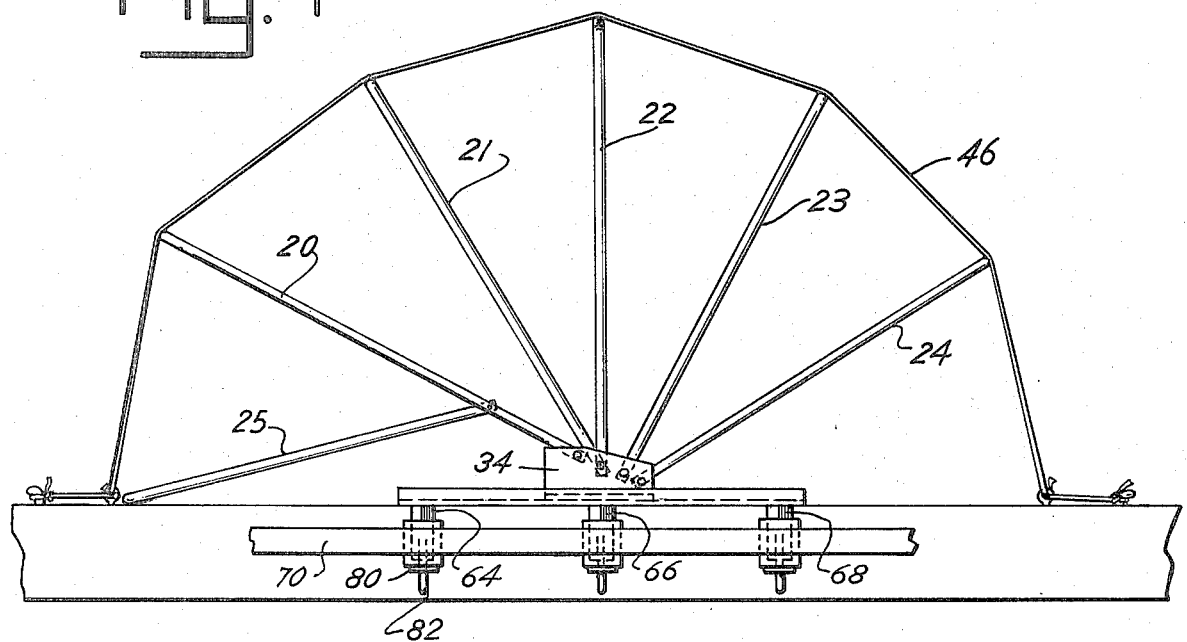
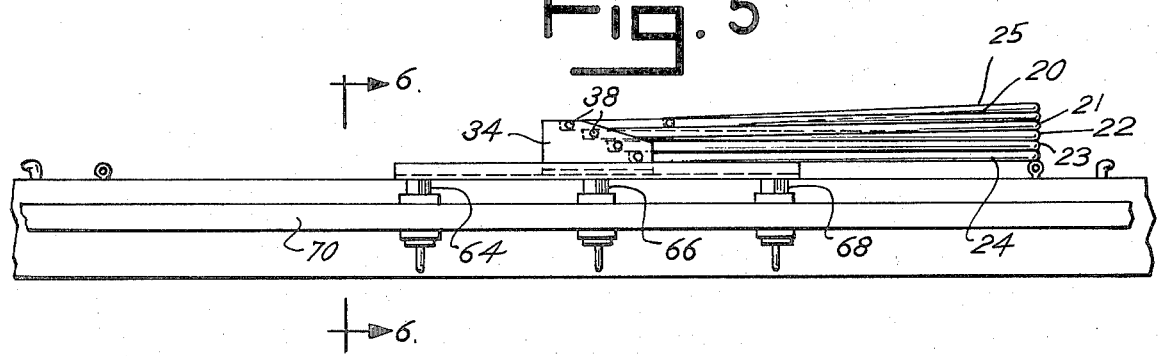
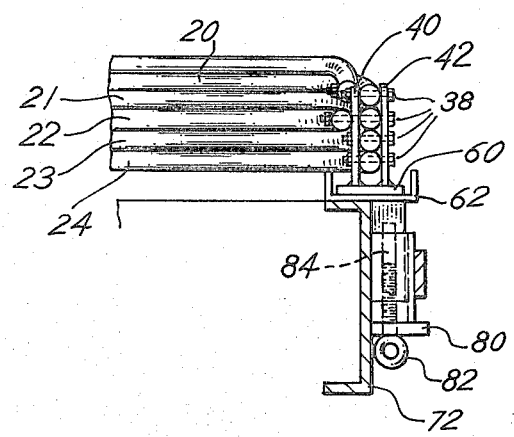

FOLDING CANOPY FOR TRUCK AND TRAILER LOADS

BACKGROUND OF THE INVENTION

In transporting loads of a variety of different types of materials and products on flatbed semitrailers, the normal practice is to cover the load with a tarpaulin which is pulled relatively tight and then tied down at its edges to rails or other fixtures on the edges of the trailer bed. Certain types of products, however, are of such a shape and size that covering them with a tarpaulin is quite difficult and often results in incomplete protection of the products from the weather and corrosive road dust and slush. Since many of the products of odd shapes and sizes are only occasionally transported, the use of a tarpaulin is an acceptable inconvenience; however, some products, such as coils of steel from steel mills to steel fabricators, are constantly being transported over the highways, sometimes for substantial distances, on semitrailers, and the same trucking firms and/or trailers are used in this operation. Consequently, the normal practice of throwing the tarpaulin over the coils and tying it down with ropes or cords at its edge results in a substantial loss of time to the overall operation, as well as affording unacceptable protection to the coils in adverse weather and road conditions. An attempt in the past to use a canopy-type enclosure for steel rolls and the like utilized a frame and cover structure similar to the old buggy top, wherein the cover was attached to all frame members and would interfere with handling of the load when the canopy was in its folded position. The prior canopy could not easily be unfolded over the load, was not compact and would not fit closely over the load in the unfolded position. It is therefore one of the principal objects of the present invention to provide a canopy for rolls of steel and similar loads as they are being transported on trucks and semitrailers, which can be quickly placed over the loads after the loads have been loaded either on a truck or semitrailer or on a pallet for the loads, and which encloses the load and closes around the bottom of the load when the canopy is placed over the load.

Another object of the invention is to provide a canopy for loads on a truck, semitrailer or pallet, which will unfold over the load in relatively close proximity thereto to provide a compact and streamlined configuration during transportation of the load, and which will easily fold into the load exposed position where it will not interfere with the loading and unloading of the coils of steel or other loads of similar size and/or shape.

A further object of the invention is to provide a canopy for protecting coils of steel and like products during transportation, which is so constructed and designed that it will unfold over the product in close proximity thereto from one end or edge thereof and which can readily and effectively be secured in place over the load on a truck, semitrailer or pallet.

Still another object is to provide a canopy of the aforesaid type which can be readily adapted to and mounted on various trucks, semitrailers and pallets without any substantial modification, and which is relatively simple in construction and operation and is sturdy and capable of long continuous use without servicing or repair.

SUMMARY OF THE INVENTION

The foregoing objects and advantages are accomplished by the present invention, which includes generally a foldable canopy having a frame of a plurality of generally U-shaped members pivotally connected at their free ends to oppositely disposed supports. The supports are adapted to be secured to the sides of the bed of the truck or semitrailer or to the sides of a pallet near the longitudinal center of the load, so that the U-shaped members will pivot from one end of the load over the top thereof with one or two of the members passing completely over the load to the opposite end. A cover of tarpaulin, relatively thick plastic sheet, or other waterproof sheet material is supported by the U-shaped frame members when the canopy is in its unfolded position but is not secured to all the frame members. The cover is secured to the end U-shaped member which swings from the folded position at one end to the fully unfolded position at the other end, and the cover is secured to the transverse portion thereof. A spacing strap or the like is used to unfold the members and hold them in their proper spaced position beneath the unfolded cover. Provisions are normally made for securing the lower edges of the canopy to the bed of the truck or semitrailer or pallet while the load is being transported.

BRIEF DESCRIPTION OF THE DRAWINGS

FIG. 4 is a side elevational view of the frame and support members with the cover removed, showing the position of the various members when the canopy is in its unfolded position;

FIG. 5 is a view similar to that of FIG. 4 except that the frame members are in folded position; and FIG. 6 is a fragmentary partial cross sectional and elevational view of the canopy frame and support members, the section being taken on line 6—6 of FIG. 5.

DESCRIPTION OF THE PREFERRED EMBODIMENT

Figure 1:
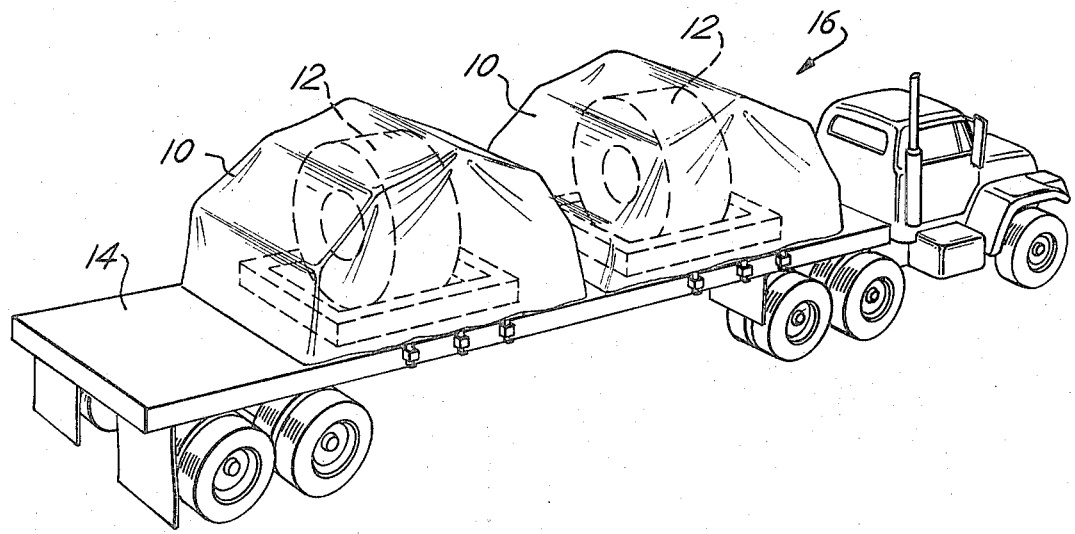
FIG. 1 is a perspective view of a semitrailer having mounted thereon two coils of steel and the present canopy shown in outline over the two coils.

Referring more specifically to the drawings, and to FIG. 1 in particular, numeral 10 indicates generally two canopies embodying the present invention, shown in their unfolded position over steel coils 12 loaded on the bed 14 of semitrailer 16. The details of the canopy are not seen in FIG. 1 and the figure is used primarily to illustrate one type of load which can effectively be protected by the present canopy. Other types of loads can be covered by the canopy in very much the same way as the coils of steel illustrated.

The embodiment of the canopy illustrated in the present drawings consists of inverted U-shaped frame members 20, 21, 22, 23, 24 and 25 each having a transverse portion 26 and legs 28 and 30. The lower ends of legs 28 and 30 are attached to support members 32 and 34 by pins 36 and 38 extending through inner and outer side walls 40 and 42 of the support member, the pins 36 extending through the two side walls and the lower end of legs 28 of the first five frame members, and pins 38 extending through the two side walls and the lower ends of legs 30 of the first five frame members. The pins on which the frame members pivot are arranged in a decreasing height relationship from frame 20 to frame 24 so that the frame members will fold downwardly in full contact with one another, as illustrated in FIG. 5, when they are in their completely folded or lowered position. The pins are also spaced apart both vertically and horizontally so that the frame members will pivot freely upwardly and over the load without any interference from the other members. In order to make the support structure more compact, one pin on each side is used for the legs of frame members 21 and 22. The legs of frame members 20, 21, 23 and 24 are disposed between the inner and outer side walls 40 and 42 and the lower ends of frame member 22 are disposed on the inner side of the inner wall 40 of the two support members 32 and 34. Member 25 is pivotally mounted on member 20 and swings downwardly to the bed or other supporting surface to assist in tying down the respective end and sides of the cover when the canopy is in its fully unfolded position. The frame members are held in spaced relation in their unfolded position by a strap 44 with ends 46 and 48 which can be tied to an eye bolt or other type of anchor indicated by numerals 50 and 52, secured to the bed of the semitrailer or truck or to the edges of a pallet. The strap is attached by a loop or other suitable means 54 to the transverse portion 26 of each of the frame members so that the frame members are held firmly in preselected positions with respect to one another. The strap is preferably not attached to frame member 25, since it is used to pull the cover taut over the other frame members. The cover 60 is attached to the frame member 25 at the transverse portion thereof and is preferably not connected to any of the other U-shaped members to that it can fold out of the way of the load when the canopy is in its fully folded position and can be pulled and adjusted over the frame members when the canopy is unfolded over a load. The cover may be of a canvas tarpaulin or heavy flexible plastic sheet material, preferably fabric reinforced, which forms a complete enclosure when the canopy is unfolded over the top of the load and on each side of the load. The sides and top are joined integrally to one another to form a water-proof structure which fully encloses the load with the exception of the bottom, which is protected by the floor of the truck bed, pallet or any suitable load support structure.

The two side walls of the support members are essentially identical to one another and are secured to a plate 60 which in turn is secured to an elongated channel 62. The support, including the channel, is attached to one side of the bed of the semitrailer, using suitable securing means, the securing means shown in the drawings consisting of three posts 64, 66 and 68 extending downwardly through slots between side bar 70 secured to the side of the truck bed and frame member 72 of the semitrailer. The posts are held in pockets 74, 76 and 78 by collars 80 and threaded eye bolts 82 which extend up through the collars into threaded holes 84 in the posts. When the posts have been inserted in pockets 74, 76 and 78, the collars and eye bolts are inserted beneath the pockets and secured to the posts with the collars abutting against the bottom end of the pockets. The preceding description refers primarily to support member 34; however, the description applies also to support member 32 on the opposite side, with the exception of modifications which are readily apparent from the drawings to adapt it to the opposite side. The difference is principally in the offsetting of the posts 64, 66 and 68 toward the respective outer side of channel 62 so that a substantial portion of the channel of each support member will rest on the top of the bed 14 after the support members have been secured in place along the sides of the bed.

In its unfolded position, the cover is secured to the bed of the truck by a series of cords or cables 90 secured to the cover by a corresponding series of eyes 92 attached to a strap 94 which in turn is secured around the cover upwardly from the bottom thereof. The lower edge of the cover is also secured by cords or sections of a rope 96 extending through eyes 98 in the margin 100 of the cover. The cords 90 and 96 are tied to a series of studs or eyes 102 or any other suitable type of anchor along the side of the bed of the semitrailer. With this tie-down arrangement the cover is held firmly in place once it has been placed over a load by unfolding the cover and supporting frame members to the position illustrated in FIGS. 1 through 4.

In the use and operation of the present canopy for truck and trailer loads, when used, for example, in protecting coils of steel, the coils of steel are loaded on the bed of the semitrailer by any suitable means. They may be loaded in trough shaped pallets as illustrated in the drawings, or these pallets may be supported on legs which permit the trailer to back into and under the pallets and lift the pallets for transporting. The canopy or canopies, depending on the number of individual loads on the trailer, are attached to the bed of the truck or the pallet by securing support members 32 and 34 to the sides of the bed in a manner similar to that shown in the drawings. Each canopy is then unfolded over the load by raising the inverted U-shaped frame members along with the cover, from the position shown in FIG. 5 to the position shown in FIGS. 1 through 4. With the canopy fully unfolded, the support members give firm support to the top of the cover to hold the cover above the load, and the lower edges of the cover are tied down in the manner illustrated in FIG. 2, with the cords preferably extending through the both rows of eyes 92 and 98 to the studs in the frame of the trailer bed or pallet. Since the cover is not secured to any of the frame members, except member 25 at its transverse portion, the cover can be easily adjusted over all the members when they are in their unfolded position and can be compactly folded when the canopy is folded, to a position where it does not interfere with the handling of the load. The strap 44 spaces and holds members 20, 21, 22, 23 and 24 to provide effective support to the cover without preventing the cover from being adjusted over and along the side of the members when the canopy is in its unfolded position.

With the cover secured over a load in the foregoing manner, the load is fully protected and can be safely transported by the semitrailer or truck without exposing the load to the elements or adverse road conditions such as slush, dust and mud. When the load is to be removed from the trailer or truck, the cords are untied and the frame members are folded from their unfolded position of FIG. 4, for example, to the position shown in FIGS. 5 and 6, where the load is fully exposed and can be readily removed from the bed of the truck or trailer. While coils of steel have been shown in the drawings, various types of loads may be covered effectively by the present canopy.

Figure 3:
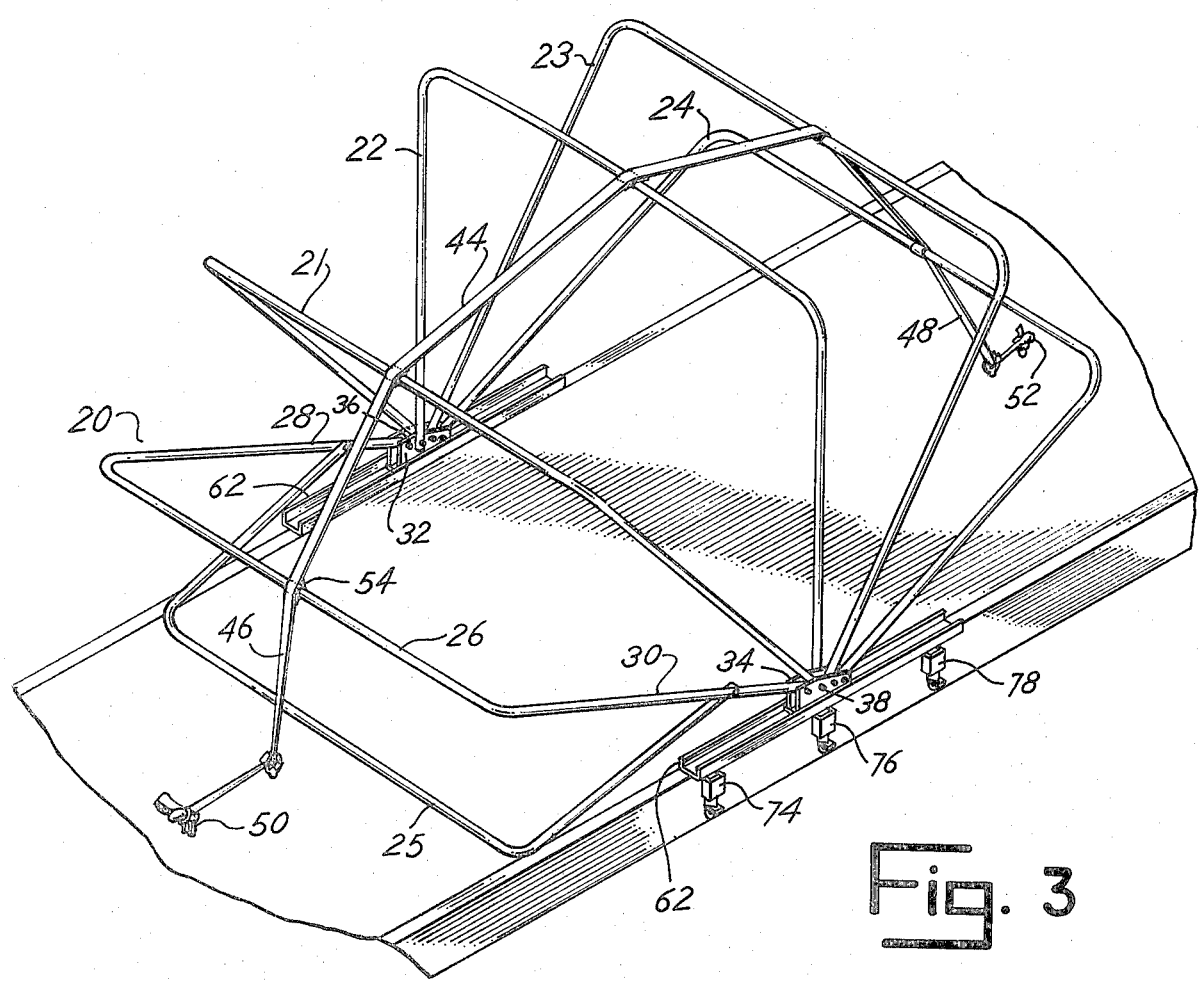
FIG. 3 is a perspective view of one embodiment of the frame of the canopy shown in FIGS. 1 and 2.
Figure 2:
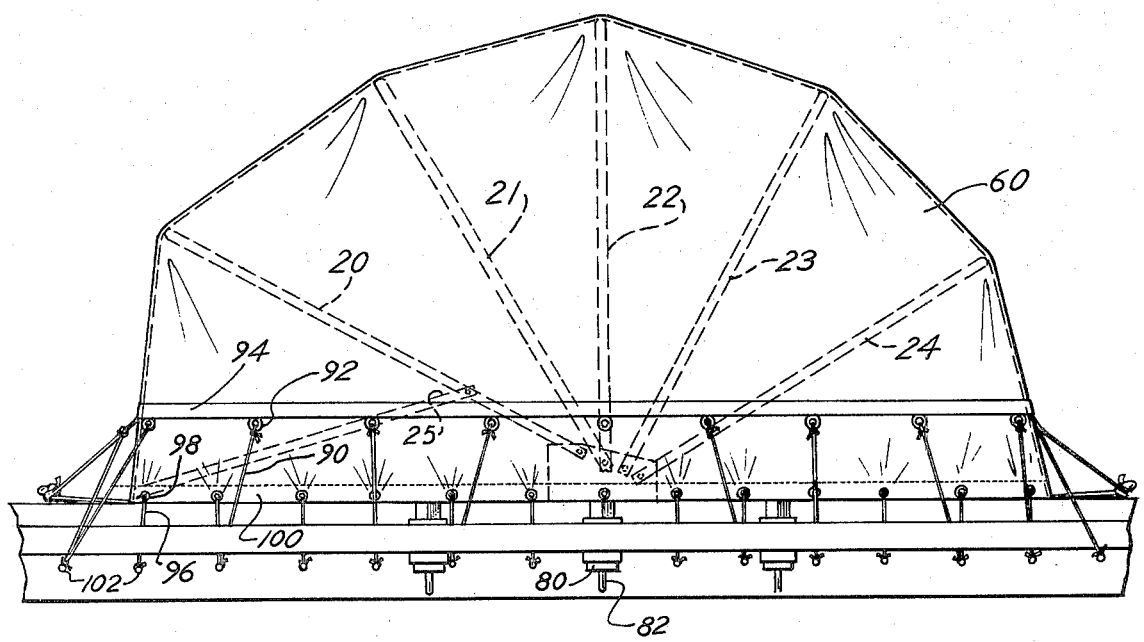
FIG. 2 is a side elevational view of one of the canopies seen in FIG. 1, showing more details of the canopy in its unfolded position on the semitrailer bed.

Various changes may be made in the structure of the canopy, including the relationship of the frame members to one another at their pivot points, consistent, of course, with the first frame member 25 to the left as seen in FIG. 1 and the last frame member 24 to the right as viewed in FIGS. 2, 3 and 4 being the end members of the frame. One or more frame members in addition to the five full members shown may be used if desired, including frame member 25 extending substantially horizontally to provide a rigid member at the lower edge of the cover for assisting the tie members in holding the lower edges of the cover securely in place. In particularly large canopies, secondary U-shaped members may be provided on the primary members illustrated in the drawings, the secondary members being substantially the same shape as the primary members 21 through 24, but being pivotally secured to the primary members along the legs thereof in spaced relation to the support members 32 and 34, in much the same manner as member 25. Various other changes and modifications may be made without departing from the scope of the invention.

I claim:

1. A canopy for truck and trailer loads, comprising two laterally spaced support members, means for securing said support members to the bed of a truck or trailer or to a pallet near the edge thereof, two inverted U-shaped end frame members and a plurality of inverted U-shaped intermediate frame members having the free ends thereof pivoted to said support members and being adapted to fold downwardly to a horizontal position at one longitudinal end of said support members and to unfold over a load, with the uppermost end member of the folded U-shaped members being disposed on the opposite longitudinal end, a spacer means being attached to most of said members to hold said members in spaced relation to each other, and a weather resistant flexible sheet forming a cover extending between and connected only to the one end frame member including said uppermost U-shaped end frame member which is uppermost when the members are in folded position, said cover when unfolded forming an enclosure over and at the sides of a load, and a means for securing the lower edges of said cover when the canopy is in its unfolded position.

2. A canopy for truck and trailer loads as defined in claim 1 in which said U-shaped frame members are pivoted to each of said support members by pins in progressively higher positions from the end frame member remaining at the folded end to the end member which pivots to the opposite longitudinal end.

3. A canopy for truck and trailer loads as defined in claim 1 in which each of said support members includes an elongated rigid member adapted to be positioned along the respective side of the bed and to support upwardly extending, spaced side walls for receiving the ends of the U-shaped frame members, and pivot pins extending through said side walls and the respective frame members.

4. A canopy for truck and trailer loads as defined in claim 2 in which each of said support members includes an elongated rigid member adapted to be positioned along the respective side of the bed and to support upwardly extending, spaced side walls for receiving the ends of the U-shaped frame end members, and pivot pins extend through said side walls and the respective frame members.

5. A canopy for truck and trailer loads as defined in claim 4 in which there are four intermediate U-shaped frame members, two of which are disposed on the same pivot point.

6. A canopy for truck and trailer loads as defined in claim 1 in which means is provided on each of said support members for securing said support members to a truck or trailer bed or to a pallet.

7. A canopy for truck and trailer loads as defined in claim 6 in which each of said support members includes an elongated member and means attached to said elongated member for securing said support member to the bed of the truck or trailer or to a pallet.

8. A canopy for truck and trailer loads as defined in claim 1 in which there are three intermediate U-shaped frame members, two of which are disposed on the same pivot point.

9. A canopy for truck and trailer loads as defined in claim 1 in which said spacer means is a strap-like means secured to the transverse portion of each of said U-shaped frame members, except said uppermost member, for spacing said frame members in a predetermined relationship, said strap-like means having end extensions for securing said strap means to an anchor at opposite ends of the canopy.

10. A canopy for truck and trailer loads as defined in claim 1 in which said cover is attached only to said uppermost U-shaped member and said cover has a top extending from one end to the other and has opposite side walls joined integrally with said top.

11. A canopy for truck and trailer loads as defined in claim 9 in which said cover is attached only to said uppermost U-shaped member and said cover has a top extending from one end to the other and has opposite walls joined integrally with said top.

12. A canopy for truck and trailer loads as defined in claim 1 in which a means for securing the lower edge of the cover when the canopy is in its unfolded position includes a series of cord tying means in a row around the cover in spaced relation to the bottom of the cover and a row of cord tying means near the lower edge thereof.

13. A canopy for truck and trailer loads as defined in claim 12 in which said cover is attached only to said uppermost U-shaped member and said cover has a top extending from one end to the other and has opposite side walls joined integrally with said top.

14. A canopy for truck and trailer loads as defined in claim 1 in which each of said support members includes longitudinally positioned spaced walls for receiving the free ends of said U-shaped frame members therebetween and pivot means disposed in an ascending position from the normally folded end of the canopy to the opposite longitudinal end for forming a structure which will fold downwardly with the frame members in parallel relation to one another and unfold into the load protecting position with at least some of the frame members pivoting upwardly and over the load, and with the end frame member which is in the uppermost position when the canopy is in folded position, extending longitudinally in the opposite direction when the canopy is in unfolded position.

* * * * *